United States Patent Office 3,801,694
Patented Apr. 2, 1974

3,801,694
STATIC LEACHING PROCESS
Gerald F. Pace and Earl W. Shortridge, Ponca City, Okla., assignors to Continental Oil Company, Ponca City, Okla.
No Drawing. Continuation-in-part of abandoned application Ser. No. 135,456, Apr. 19, 1971. This application Nov. 15, 1971, Ser. No. 199,027
Int. Cl. B01d 11/00
U.S. Cl. 423—20                                  12 Claims

ABSTRACT OF THE DISCLOSURE

The present invention relates to a method for leaching a mineral from an ore containing said mineral wherein an acid lixiviant containing a soluble aluminum salt is introduced under pressure into a vessel containing a bed of ore. A sweep fluid is then introduced into said vessel to sweep the lixiviant containing the dissolved mineral values out of said ore bed. An additional aspect of this invention is a step of drying said ore in an agitated state prior to leaching.

CROSS-REFERENCE TO RELATED APPLICATIONS

This is a continuation-in-part of our application filed Apr. 19, 1971, under Ser. No. 135,456, entitled Static Leaching Process and now abandoned.

BACKGROUND OF THE INVENTION

Field of the invention

The present invention relates generally to a static leaching process wherein an acid leaching solution containing a soluble aluminum salt is passed through a bed of ore to remove the mineral content from said ore. An additional aspect of this invention is a step of drying said ore in an agitated state prior to leaching.

Description of the prior art

Most commercial uranium ores contain only a few pounds of uranium in each ton of ore. Most conventional benefication processes involve leaching the uranium minerals with suitable solvents, then separating the uranium bearing solvent from barren gangue and finally precipitating the dissolved mineral from its solvent.

The separation processes usually employ agitation, pumping, settling, and in a relatively dilute fluid medium. Only minute quantities of solvent are utilized in actually leaching of the mineral. Most of the reagent is required to maintain sufficient reagent concentration in the abundant fluid medium to drive the leaching reactions forward. Additional dilution is imparted to the process in the course of decanting, settling and separating the uranium bearing solvent from barren gangue. The inevitable result is substantial loss of reagent, mostly by dilution.

These conventional processes use great quantities of fluid, water, and reagents in a large and costly plant. The resulting mineral bearing solvent is very dilute and therefore very costly to treat.

Present uranium ores are leached two ways; one is an agitated leach, the other is a static leach. In the case of the agitated leaching, large volumes of lixiviant are required to do the leaching and a solvent-solution separation step must be used before the uranium can be recovered from the lixiviant. The disadvantages of this system are the large volumes required for leaching, power cost for agitation, high equipment cost for solid-solution separation and excessive dilution of lixiviant after uranium dissolution resulting in a solution low in uranium concentration and low in acid content. If the lixiviant were not excessively diluted during the solid-solution separation step, a large portion of the acid in this solution could be used again.

In the case of present static leaching operations, two methods are used: One is to introduce the lixiviant to the top of a heap of raw ore and allow the lixiviant to percolate through the ore; and the other is to introduce an acid solution with a low concentration of sulfuric acid on top of a heap of ore that has been previously mixed with a solution with a very high acid concentration. There are some problems with this type of leaching; the flow rate is usually extremely low, and there is a great possibility that all the ore will not come into contact with the lixiviant.

SUMMARY OF THE INVENTION

The present invention relates to a method for recovering mineral values from a permeable heterogeneous bed of ore containing said mineral. The method involves first loading the ore into a suitable container for leaching. The acid lixiviant containing a soluble aluminum salt is then introduced under pressure into the vessel containing the bed of ore. After the required amount of lixiviant has been introduced into the ore bed, a low cost fluid is injected to force the lixiviant containing the dissolved mineral values out of the ore bed. An additional step of this invention involves drying said ore in an agitated state prior to leaching.

It is an object of this invention to accomplish the leaching of uranium ore with a substantially smaller volume of lixiviant than is required in prior art processes.

A further object of this invention is to provide a process wherein the flow rate of leaching fluid and sweep fluid through the bed of ore is improved.

It is also an object of this invention to provide a process wherein there is no need for a solid-solution separation step because the lixiviant discharging from the ore bed is essentially free of solids. Other and further objects will become apparent from the following detailed description of the invention.

DETAILED DESCRIPTION

Broadly described, this invention accomplishes the recovery of mineral values from a permeable heterogeneous bed of ore. The method involves first loading the ore into a vessel for leaching. An acid lixiviant, containing a soluble aluminum salt, is then introduced under pressure into the vessel containing the bed of ore. After the lixiviant has been introduced into the ore bed, a low cost fluid is injected to force the lixiviant containing the dissolved values out of the ore bed. An additional optional step is drying the ore, while in an agitated state such as in a gas fired rotary dryer, to improve the flow characteristics of solutions through the ore bed. The novel embodiments of this invention are the introduction of an acid lixiviant under pressure; the drying of the ore, while in an agitated state, to improve the flow characteristics, sweeping the lixiviant with a low cost fluid; and the addition of the soluble aluminum salts to the acid lixiviant. This process is particularly useful for recovering the mineral values from a uranium containing ore. In a system such as this the uranium ore is dried in a gas fired rotary dryer to remove the moisture content and then the mineral ore is placed in a vessel and the lixiviant is introduced under pressure. This lixiviant can be a 1 to 20 weight percent mineral acid solution containing from about 0.2 gram aluminum per liter to about 8 grams aluminum per liter. The lixiviant is introduced under pressure and is then swept through the bed of ore by sweep fluid such as an aqueous solution of potassium sulfate containing less than 10 weight percent potassium sulfate. Water can also be used as a sweep fluid.

The pressure under which the lixiviant is introduced into the system can vary over a wide range of values. The lower limit of pressure being that pressure which will cause sufficient flow of fluid through said bed of ore. The upper limit of pressure is that pressure which can be employed and still retain said bed of ore in place in said vessel. The actual pressure required in each specific case must be determined due to the differences in permeability of various ores.

The permeability of the ore is improved by drying the ore prior to the leaching step. It has been discovered that the lixiviant will flow through the ore bed at a much greater rate if the ore is dried prior to the leaching step. It has also been unexpectedly discovered that drying said ore in an agitated state, such as in a rotary dryer, greatly improves the flow rate of the lixiviant through the bed of ore, and said improvement is not accomplished when said ore is dried in a static state, such as ordinary oven drying.

The method of this invention effectively alleviates the problems inherent in present uranium leaching. This leaching process requires a substantially smaller volume of lixiviant due to the small amount used in leaching as well as no dilution for solid-solution separation. There is no need for a solid-solution separation step because the lixiviant discharging from the ore bed is essentially free of solids.

Also, the effluent often contains a large fraction of the acid required in leaching and can be recycled, whereas in agitated leaching this acid has been diluted and only a very small portion can be reused. Drying the ore while in an agitated state before leaching greatly improves the flow characteristics of the lixiviant in the ore.

It is known in the art that many ores contain soluble aluminum salts which appear in the acid leaching solution during leaching of said ores to recover their mineral content. These acid sensitive ores exhibit a reduced permeability upon contact with acid leaching solutions. It has been discovered that when said ores are leached with an acid leaching solution, the leaching solution, after contacting said ore, contains a portion of these soluble aluminum salts, but the permeability of said ore is reduced.

It has been unexpectedly discovered by applicants that when said acid sensitive ores are leached with an acid leaching solution, containing a soluble aluminum salt, the leaching solution, after contacting said ore, does not show an increase in concentration of said soluble aluminum salts and the permeability of said ore is not decreased.

The aluminum salts which have been found effective in this process are those salts which are soluble enough in the acid leaching solution to contain from about 0.2 gram aluminum per liter to about 8 grams aluminum per liter in said acid leaching solution. The preferred soluble aluminum salt is aluminum sulfate having the formula $Al_2(SO_4)_3 \cdot 18H_2O$.

The acid leaching solution should be one in which the desired mineral is soluble. Suitable acids are 1 to 20 weight percent mineral acids such as sulfuric acid, hydrochloric acid and nitric acid. When the mineral desired is uranium, the preferred acid leaching solution is sulfuric acid having a weight percent range of from about 5 to 10 percent.

The effect of use of various concentrations of soluble aluminum salts as an inhibitor of reduction of permeability of uranium bearing ores during an acid leaching operation is shown by the following example.

EXAMPLE 1

Dry uranium bearing ore was placed in a column having 1⅛ inch ID, with said ore having a height of 12 inches in said column. Fifty milliliters of 10% by weight sulfuric acid, containing the appropriate amount of aluminum sulfate, was added to the column and allowed to percolate down through the column until the liquid level was even with the top of the ore. Water was then added and a one inch head of water was maintained throughout the remainder of the experiment. After the 50 milliliters of leaching acid was purged from the column, the average flow rate of the next 40 milliliters of water was recorded. The results are shown in the following table.

TABLE

| Run No. | Gram/liter of $Al_2(SO_4)_3$ 10% sulfuric acid leach solution | Average flow rate of water through leached ore, inches/minute |
| --- | --- | --- |
| 1 | 0 | 0.30 |
| 2 | 5 | 0.50 |
| 3 | 10 | 0.70 |
| 4 | 15 | 0.90 |
| 5 | 20 | 1.00 |
| 6 | 25 | 1.10 |
| 7 | 30 | 1.30 |
| 8 | 35 | 1.40 |
| 9 | 40 | 1.45 |
| 10 | 50 | 1.50 |
| 11 | 60 | 1.60 |
| 12 | 70 | 1.60 |
| 13 | 80 | 1.60 |

The following examples further illustrate the process of this invention.

EXAMPLE 2

Ore: 1.4 kg. of 1'4" ore obtained from a uranium ore body located in South Texas.
Column: 1⅛" ID x 6' length lucite column with 200 mesh stainless steel screen as false bottom.
Leach Acid: 5% $H_2SO_4$.
Sweep Solution: Tap water.
Procedure: Ore was dried by the appropriate method and placed into the column through a funnel. Leaching acid was added to the top of the column and 2–6 inches constant head maintained. Percolation distances were determined by measuring the wet ore interface from the top of the ore. After 500–600 ml. of acid had been added, the level of acid was allowed to drop to the top of the ore and then tap water was substituted for the acid.
Drying method:
1. Wet ore—Used ore as received. The ore contained 9% water.
2. Oven dried ore—Ore was placed into trays 3' x 3' x 4" and dried at 250 degrees F. in a large oven. Samples were split out of a 1000-lb. lot dried in this manner.
3. Rotary flame dried—This dryer consisted of a torch directed into a 20' cylinder 1' in diameter with lifters on the inside. The cylinder rotated at a small downward angle. At the bottom of the cylinder was a ¼" screen. Ore was fed into the dryer at the top of flame end, and the moisture content of the dried ore was controlled by the feed rate of the ore to the dryer.
Data:

| Drying method | Percolation rate, in./min. | Sweep rate, in./min. |
| --- | --- | --- |
| 1 | .115 | .0065 |
| 2 | .164 | .023 |
| 3 | .260 | .045 |

EXAMPLE 3

Ore: 4.5 kg. of —¼" ore obtained from a uranium ore body located in South Texas.
Column: 1⅛" ID x 20' tall lucite column with 200 mesh stainless steel screen as false bottom.
Leach acid: 5% $H_2SO_4$+30 gm. $Al_2(SO_4)_3 \cdot 18H_2O$/liter+0.75 gm. $NaClO_3$/liter.
Sweep solution: Tap water.
Procedure: Ore was dried by the appropriate method and placed into the column through a funnel. Leaching acid was added to the top of the column and a constant head of 2–6 inches was maintained. Percolation distances were determined by measuring the wet ore interface from the top of the ore. After 1500 ml. of acid had been added and the acid level dropped to the top of the ore, tap water was added and a constant head of 206 inches maintained. The test was complete after 1500 ml. of solution was collected from the bottom of the column.

Drying method:
1. Used ore as received. The ore contained 9% water.
2. Oven dried ore—ore was placed into trays 3' x 3' x 4" and dried at 250 degrees F. in a large oven. Samples were split out of a 1000-lb. lot dried in this manner.
3. Rotary flame dried—this dryer consisted of a torch directed into a 20' cylinder 1' in diameter with lifters on the inside. The cylinder rotated at a small downward angle. At the bottom of the cylinder was a ¼" screen. Ore was fed into the cylinder at the top or flame end, and the moisture content of the dry ore was controlled by the feed rate of the ore to the dryer.

Data:

| Drying method | Percolation rate, in./min. | Sweep rate, in./min. |
|---|---|---|
| 1[1] | [2].113 | .077 |
| 2 | .158 | .135 |
| 3 | .223 | .232 |

[1] Wet ore was actually run in a 11.25" diameter column and values calculated on the basis of 1.125" column.
[2] Corrected value due to 9% water.

Although certain specific embodiments of the invention have been described as exemplary of its practice these examples are not intended to limit the invention in any way. Other process parameters and materials may be used in accordance with the broad principles outlined herein and when so used are deemed to be circumscribed by the spirit and scope of the invention except as necessarily limited by the appended claims or reasonable equivalents thereof.

What is claimed is:

1. A process for recovering mineral values from a bed of ore in a leaching vessel wherein said ore bed exhibits a reduced permeability upon contact with a leaching solution, said process comprising loading said ore into said leaching vessel, introducing said leaching solution into said leaching vessel to recover the mineral content of said ore, adding a soluble aluminum salt to said leaching solution prior to adding said leaching solution to said leaching vessel and contacting said ore, said soluble aluminum salt having a solubility sufficient to contain from about 0.2 gram aluminum per liter of said leaching solution prior to contacting said ore with said leaching solution.

2. A process of claim 1 in which the leaching is static leaching.

3. A process of claim 1 in which the leaching solution is displaced from said ore by a sweep fluid.

4. The process of claim 1 wherein the mineral recovered is uranium.

5. The process of claim 1 wherein said leaching solution is a 1 to 20 weight percent mineral acid.

6. The process of claim 1 wherein said leaching solution is 5 to 10 weight percent sulfuric acid.

7. The process of claim 1 wherein said sweep fluid is an aqueous potassium sulfate solution having less than 10 weight percent potassium sulfate.

8. The process of claim 1 wherein said sweep fluid is water.

9. The process of claim 1 wherein said soluble aluminum salt is hydrated aluminum sulfate having the formula $Al_2(SO_4)_3 \cdot 18H_2O$.

10. The process of claim 1 wherein said soluble aluminum salt is present in an amount to provide from about 0.2 gram aluminum per liter to about 8 grams aluminum per liter of leaching solution.

11. The process of claim 1 wherein the additional step of drying said ore in an agitated state is carried out prior to leaching.

12. The process of claim 11 wherein said drying is carried out in a gas fired rotary dryer.

References Cited
UNITED STATES PATENTS

| | | | |
|---|---|---|---|
| 2,843,450 | 7/1958 | Long | 23—323 |
| 3,288,569 | 11/1966 | Henrickson et al. | 23—321 |
| 2,772,957 | 12/1956 | Thomsen | 75—115 |
| 2,894,809 | 7/1959 | McCullough et al. | 23—321 |
| 1,098,282 | 5/1914 | McCoy | 23—321 |
| 2,819,145 | 1/1958 | McCullough et al. | 23—321 |
| 2,797,977 | 7/1957 | Forward et al. | 75—115 |
| 3,126,249 | 3/1964 | Atkin | 23—321 |

BENJAMIN R. PADGETT, Primary Examiner

R. L. TATE, Assistant Examiner

U.S. Cl. X.R.

23—312 ME; 75—101